United States Patent Office 3,428,487
Patented Feb. 18, 1969

3,428,487
APPARATUS AND METHOD FOR PRODUCING SUGAR SOLUTIONS
Edward Ronald Allen, Brighton, N.Y.
(258 Avalon Drive, Rochester, N.Y. 14618)
Filed May 24, 1965, Ser. No. 458,062
U.S. Cl. 127—22                6 Claims
Int. Cl. C13f 1/14

ABSTRACT OF THE DISCLOSURE

A sugar solution is formed by adding to a measured quantity of water, a quantity of dry sugar measured by operating a sugar conveyor for a predetermined length of time. The quantity of sugar added to the water is selected so as to give a solution somewhat stronger than the strength or concentration ultimately desired. The concentration of the solution thus formed is determined by passing a sample through a bubble column, the output of which is fed, through intermediate elements, to a computing relay and thence to a pneumatically operated controller which controls the addition of trim water in an amount sufficient to lower the concentration from the original strength to the concentration ultimately desired. A sensing device on a main storage tank then determines the available capacity in the main tank. If there is sufficient space in the main tank, the newly formed solution in the melt tank is transferred to the main tank, to be used as required. If the main tank does not have sufficient space to receive the entire batch of newly formed solution in the melt tank, the solution is held in the melt tank until such time as space is available in the main tank, and is then transferred.

---

This invention relates to the production of sugar solutions for use in industry, such as in food processing plants.

An object of the invention is the provision of generally improved and more satisfactory apparatus for producing such solutions in an economical, rapid, and accurate manner.

Another object is the provision of an improved method for producing such solutions.

Still another object is the provision of improved apparatus so designed that it may utilize many component parts already known in industry and commercially available, thus minimizing the need for specially built parts, which known parts are, however, operatively connected to each other in a novel combination in order to function in accordance with the present invention.

A further object is the provision of an apparatus and method for making sugar solutions, in which the amount of sugar added to the water is not measured by weight, as in the prior art, but rather by the factor of time.

A still further object is the provision of a sugar solution making apparatus and method which utilizes a bubble column of improved design for measuring the concentration or strength of the solution.

These and other desirable objects may be attained in the manner disclosed as an illustrative embodiment of the invention in the following description and in the accompanying drawings forming a part hereof, in which.

According to the method of the present invention, water is supplied to a batch tank or container. When the water reaches a predetermined level, an agitator in the tank is set into motion, and the introduction of dry sugar commences, through a conveyor which conveys the dry sugar at a uniform rate. Instead of weighing the sugar, as in the prior art, the amount of sugar to be introduced is determined by the factor of time, the conveyor being operated for a predetermined set time which, at the known rate of introduction of the sugar, will give a solution of slightly greater concentration than the concentration ultimately desired.

The concentration of the solution is then measured automatically by means of a bubble column, in order to determine the amount of water to be added to bring the concentration or strength down to the required ultimate concentration or "Brix." (Brix refers to the concentration or strength scale commonly used in the food processing industry in connection with liquid sugar solutions). The required "trim" water is added to lower the Brix reading to the desired final amount. This completes the manufacture of the solution, but the method of the present invention involves the further step of transferring the solution from the batch tank in which it was made, to a larger storage tank, if the storage tank at that time has sufficient capacity to receive the newly made batch. The quantity in the storage tank is first sensed or determined in order to make sure that it can receive the batch from the solution tank, and if not, the batch remains in the solution tank until the storage tank has been emptied.

The above is a brief outline of the principal features of the present method. The method also involves various checks and safety factors, and provision for manual rather than automatic control under certain circumferences, all as will appear more fully during the following description of the apparatus.

A preferred form of apparatus according to the present invention, for carrying out the method of the present invention, will now be described, referring first to FIG. 1. The parts of the apparatus are here shown schematically, but the construction will be well understood by those skilled in this art.

Figure 4:
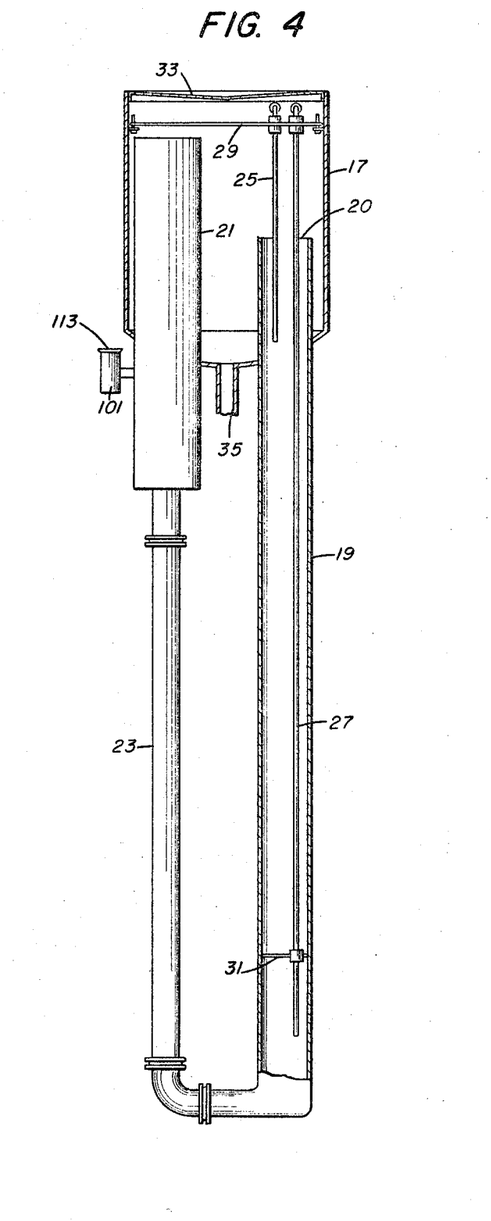
FIG. 4 is a view partly in side elevation and partly in vertical section of a bubble column according to the invention.

The batch tank for mixing the solution of water and sugar is indicated at 11. In this tank is an agitator 13 driven by a motor 15. The bubble column assembly for measuring the Brix of the solution is schematically shown in FIG. 1, and illustrated in greater detail in FIG. 4. It comprises the overflow tank 17, through the bottom of which extends the long column 19 having an open top 20 through which the liquid in the column overflows into the tank 17. Laterally offset from the column 19 and likewise extending through the bottom of the tank 17 in liquid tight relation thereto is the de-aerating chamber 21 extending upwardly from the bottom of the tank to a somewhat higher elevation than the top of the column 19. The conduit 23 provides a connection from the bottom of the chamber 21 to a point near the bottom of the long column 19. The column 19 contains the short bubble tube or bubbler 25 and the long bubble tube or bubbler 27, both suspended from a cross beam 29 extending across the tank 17 near the top. A spider 31 mounted on the long tube 27 near its lower end engages the walls of the column and serves to steady the tube in the column. A cover 33 on the tank is slightly dished downwardly toward the center, so that any vapors condensing on the under side of the cover will run to the center and drop off into the tank.

On the bottom of the tank 17 a return conduit or drain 35 goes to the top of the main tank 11. Conveniently, most of this conduit 35 is made of the plastic tubing known as "Tygon."

The bubble tubes 25 and 27 are supplied with compressed air through conventional sight feed bubblers from the compressed air supply line which, in addition to serving the sight feed bubblers, also supplies compressed air to various pneumatically operated valves and pneumatic controls. Referring again to FIG. 1, compressed air from any suitable air compressor or other source is supplied through an oil separator 41, flowing thence through the conduit 43 to a filter 45, whence the compressed air is supplied to the main compressed air supply line or conduit 47, through a control valve 49 which may, if desired, be a pressure reducing valve so that the air supply beyond this valve 49 is at a satisfactory predetermined pressure, such as about 20 pounds per square inch. A gage 51 indicates the air pressure.

From the main air supply line 47, a branch 53 goes to the first sight feed bubbler 55 and the second sight feed bubbler 57, each of these being conventional. From the first bubbler 55, a conduit 59 leads to the top of the long bubble tube 27 in the bubble column 19. From the second sight feed bubbler 57, a conduit 61 leads to the short bubble tube 25 in the bubble column 19.

Branch conduits 63 and 65 lead respectively from the conduits 59 and 61 to an instrument 67 known as a "Differential Presure Transmitter" (abbreviated DPT for short) which is a standard instrument commercially available on the market from Taylor Instrument Companies, of Rochester, New York, and possibly from other suppliers. The DPT is supplied with the necessary compresed air to operate it, through a conduit 69 leading from the main air supply conduit 47. As well understood in the art, the DPT senses the differential pressure in the two input conduits 63 and 65, and transmits an output signal through its output conduit 71, leading to the instrument 73 which is a well known and commercially available instrument known as a "Transcope Computing Relay." This instrument 73 is used in the present instance as a Brix computing relay, and may be abbreviated BCR for short.

At the bottom of the mixing tank or melt tank 11 there is an outlet controlled by a pneumatically operated control valve 81 in an outflow conduit 83 leading to a motor operated pump 85, The outlet conduit 87 of the pump leads to a three way valve 89, pneumatically controlled, from which one conduit 91 goes to the main storage tank 93. The storage tank 93 preferably has a capacity several times that of the melt tank 11; for example, the melt tank may have a capacity of 500 gallons, and the storage tank a capacity of 10,000 gallons. Another conduit 94 goes from the three way valve 89 to a T-fitting 95, from which one branch 97 leads through a valve 99 back to the mixing tank or melt tank 11 at an intermediate point of its height. Another branch 101 leads from the T-fitting 95 through a valve 103 to the de-aerating tank 21.

Assuming now that the control valve 81 is open, the pump 85 is in operation, and the three way valve 89 is positioned to direct the discharge from the pump into the conduit 94, and assuming further that the valve 99 is closed and the valve 103 is open, it will be seen that the pump will draw fluid from the bottom of the melt tank 11 and deliver the fluid into the de-aerating chamber 21. There, the air bubbles (if any are caused by operation of the agitator 13) will be removed, and the liquid will flow from the de-aerating chamber 21 down through the conduit 23, into the bottom of the bubble column 19, and upwardly in the bubble column, overflowing at the top of the column 19 into the overflow tank 17. The liquid which overflows from the top of the bubble column 19 into the tank 17 will flow back through the conduit 35 into the melt tank 11, so none is lost or wasted. But at all times a fresh sample of the liquid from the melt tank will be constantly supplied (so long as the pump 85 is operating and the valves are in the respective positions above mentioned) to the bottom of the bubble column 19, and will flow slowly up through the bubble column, overflowing at the top, which determines the liquid level in the bubble column.

Since the bubble tubes 25 and 27 are in fixed position in the bubble column, the lower ends of these tubes, from which the air bubbles issue, will be at constant distances below the liquid level. Thus the air pressure within these tubes and in the conduits 59 and 61 leading to them, will be a function of the specific gravity of the liquid within the bubble column 19. This air pressure will be transmitted through the conduits 63 and 65 to the above mentioned DPT 67, the output signal from which will be transmitted through the conduit 71 to the BCR 73, as above mentioned.

Simultaneously, the temperature of the liquid sample flowing through the conduit 101 will be sensed by the temperature sensing bulb 111, the signal from which will be transmitted through the capillary circuit 113 to the "Sensaire" temperature transmitter 115, which is a standard and well known item of equipment readily available on the commercial market. This temperature transmitter receives its necessary operating air supply through a conduit 117 leading from the main air supply conduit 47, and its output signal is transmitted through the pneumatic conduit 119 to the appropriate one of the input connections of the Brix computing relay or BCR 73. The BCR also receives its necessary operating air supply through a conduit 121 leading from the main air supply conduit 47.

With this arrangement, it is seen that the Brix computing relay 73 receives one input from the Differential Pressure Transmitter 67 which is responsive to changes in the specific gravity of the sample liquid within the bubble column 19, and receives another input from the temperature transmitter 115 which senses the temperature of the sample liquid as it flows through the conduit 101. Thus the Brix computing relay is able, by known computing techniques well understood in the art and which, per se, form no part of the present invention, the compute the specific gravity of the sample liquid in the bubble column 19, corrected for the temperature of the sample liquid, and as a result of such computation an output signal of the true Brix, corrected for temperature, is transmitted through the output conduit 123 to the Brix recorder controller 125, which may be referred to as BRC for short.

This controller recorder 125 is a standard item of pneumatic control equipment, readily available on the market, and is commercially used as a recording controller for a variety of variables, not necessarily the specific gravity of a sugar solution. It receives its necessary operting supply of air from the pneumatic conduit 127 leading from the main pneumatic supply line 47, it registers the variations in the input signal coming through the conduit 123 from the computing relay 73 on a dial 129 and preferably also records them on a paper chart so as to furnish a permanent record of the specific gravity of Brix of the sample solution at any given moment, and it produces an output signal transmitted through the conduit 131 to the timed program controller 135 which again is a standard piece of commercially available control equipment available on the market. This timed program controller is preferably of the kind known as a "Flex-O-Timer" commercially available from Taylor Instrument Companies, of Rochester, N.Y.

Figure 1:
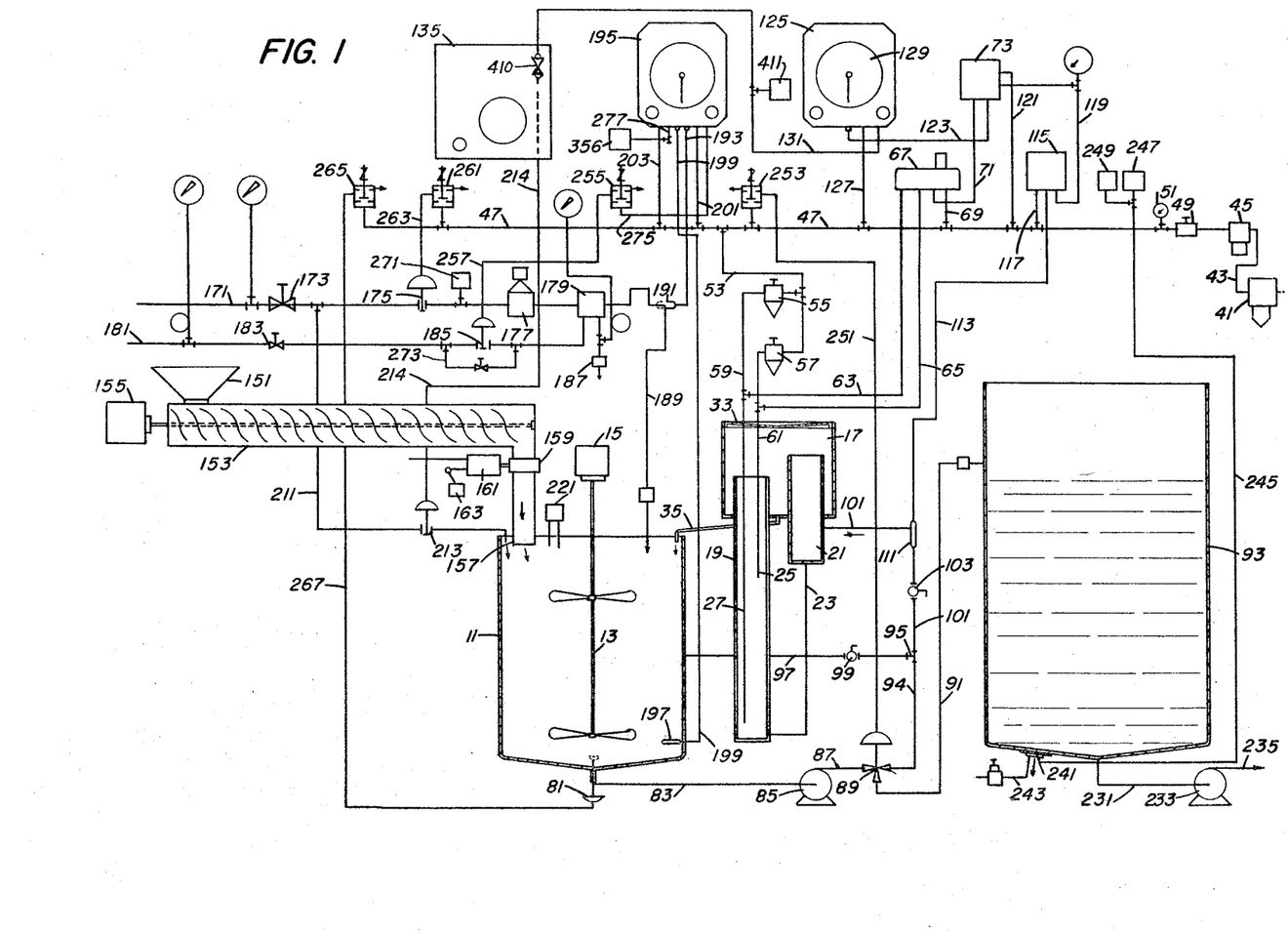
FIG. 1 is a schematic diargam of apparatus according to a preferred embodiment of the invention, for carrying out the method of the present invention.

Referring now to the means for introducing sugar into the melt tank or mixing tank 11, such means is shown schematically at the left hand end of FIG. 1. It comprises a dry sugar bin or hopper 151 which supplies to a conveyor which conveys it to the tank 11. Any suitable kind of conveyor which will deliver sugar at a uniform quantity per unit of time may be used. For example, if the bin or hopper 151 is at a level lower than the top of the melt tank 11, the conveyor may be a bucket conveyor of conventional kind having a seires of buckets on a chain or belt upwardly inclined so as to raise the sugar from the bin to a suitable level above the melt tank. In a location where it is convenient to have the hopper 151 a little higher than the top of the melt tank, a conventional screw type of conveyor may be used, extending horizontally, as indicated schematically at 153, the conveyor being driven by an electric motor 155. Either a bucket type conveyor or a screw type conveyor, when driven at a uniform rate by an electric motor, will deliver a uniform quantity of sugar per unit of time, provided the bin or hopper 151 is kept reasonably full.

The conveyor, of whatever type, delivers the dry sugar to the upper end of the chute 157 which discharges into the open top of the melt tank 11. In the chute is a control gate indicated schematically at 159, controlled by a pneumatic cylinder 161, the air supply to which is controlled by electric solenoids as mentioned below in connection with the wiring diagram, FIG. 2. There is also a limit switch or safety switch 163, operated by movement of the gate 159 to close the switch when the gate is fully open and to open the switch at all other times.

Pure water for making up the sugar solution is supplied through a main water supply conduit 171 valved at 173. The conduit continues through the pneumatically operated control valve 175 to the water counter 177, which is a conventional device for metering the flow of water by the pulse method and counting the pulses to operate an electric switch when the predetermined number of pulses has been counted. Thence the conduit continues to the water heater 179 where the inflowing water is heated by steam supplied through the main steam conduit 181, valved at 183, the flow being controlled normally by a pneumatically operated steam control valve 185 beyond which the steam conduit continues to the water heater 179. Steam condensate goes out through the steam trap 187.

The heated water from the heater 179 passes through the conduit 189 into the top of the melt tank 11. On the way, the temperature of the heated water flowing through the conduit 189 is sensed by the thermometer bulb 191, the signal from which is transmitted through the connection 193 to the recorder controller 195 which again, like most of the control equipment used, is a conventional item of equipment available on the commercial market. Preferably it is what is known as a "Fulscope Recorder Controller," commercially available from Taylor Instrument Companies of Rochester, N.Y. In addition to sensing the temperature of the incoming heated water, by means of the thermometer bulb 191 and connection 193, the recorder controller 195 also senses the temperature of the water within the mixing tank 11, by means of another thermometer bulb 197, mounted near the bottom of the tank and transmitting its indications through the connection 199 to the recorder controller 195. Compressed air supply to the recorder controller is furnished from the pneumatic supply line 47 through the conduits 201 and 203.

In addition to the main supply of heated water through the heater 179 and conduit 189, there is also provision for supplying unheated water to trim the solution to the desired Brix or specific gravity. The trim water is supplied through a conduit 211 which branches off of the main water supply conduit 171 between the valves 173 and 175. The conduit 211 passes through a pneumatically operated control valve 213, and thence into the top of the mixing tank 11. The valve 213 is controlled by the pneumatic conduit 214 leading to the controller 135, where it is connected through a pneumatic valve 410 to the output conduit 131 of the Brix recorder controller 129.

Mounted near the top of the mixing tank 11 is a water level probe assembly indicated in general at 221, having a high probe and a low probe which, when making contact with water in the tank, will give appropriate indications.

At the bottom of the main storage tank 93 is an outlet conduit 231 leading to a pump 233, the discharge conduit 235 of which goes to any desired place where the sugar solution is to be used. Mounted at the bottom of the tank 93 is a pressure sensitive indicator 241, pneumatically operated and supplied with air through the supply conduit 243 which may be connected, for example, through any conventional conduit (not shown) to the main compressed air supply line 47. Through the pressure responsive element 241, pneumatic pressure varying in accordance with the hydrostatic head in the tank 93 is transmitted through the conduit 245 to the low pressure switch 247 and high pressure switch 249, indicating low or high level of liquid in the main storage tank 93.

The three way control valve 89 is pneumatically operated through a pneumatic conduit 251 from the solenoid controlled valve 253 taking its air supply from the main air supply conduit 47. Another solenoid valve 255 controls air flow through the conduit 257 to the pneumatically controlled valve 185 in the steam supply conduit 181. Still another solenoid controlled valve 261 supplies air through the conduit 263 to the pneumatically controlled valve 175 in the water line 171. Another solenoid operated valve 265 controls flow of air through the conduit 267 to the pneumatically operated control valve 81 at the discharge conduit of the mixing tank 11.

There are also various appropriate gages, thermometers, pilot lights, safety switches, etc., some of which are schematically shown in the drawings, which do not need to be specifically mentioned or which are, in some cases, referred to in the course of the description of the operation.

To summarize the operation very briefly before undertaking a more detailed description thereof, assuming that the mixing tank or melt tank 11 is empty, hot water is first introduced through the heater 179 and inlet conduit 189. The agitator 13 is started, the conveyor 153 is started, and sugar is introduced through the chute 157 while inflow of water continues and while the water is being agitated by the agitator. After a time interval controlled by the timing unit 135, the introduction of sugar is discontinued. The sugar solution should now be at a somewhat higher sugar strength or Brix than that intended for the final solution. The operation of the pump 85 causes a sampling of the solution to flow through the bubble column 19, where the specific gravity and hence the Brix of the solution is continuously determined by the unit 67, and the output of this unit, plus the output of the temperature transmitter 115, are both fed into the Brix computing relay unit 73, the output of which is fed to the Brix recorder controller 125. At the proper time the unit 135 opens the valve 410, to connect the output conduit 131 of the Brix recorder controller 125 to the pneumatic line 214 controlling the trim water valve 213, and as a result, the trim water valve 213 is operated to add enough trim water to the tank 11, to bring the Brix reading down to the desired final amount.

When the desired Brix reading is reached, the controller 135 operates the three way valve 89 to direct the flow into the conduit 91 instead of the conduit 94. Thus the solution, now at the proper Brix or strength, is fed from the batch mixing tank 11 to the main storage tank 93, from which it is withdrawn as needed for use. This transfer to the storage tank 93 occurs, however, only if, at that time, the storage tank has sufficient unused capacity to receive the contents of the batch tank 11. If the storage tank 93 is already too full to receive the contents of the mixing tank 11, as determined by the capacity sensing unit 241, then the cycle stops and transfer to the storage tank does not occur until enough has been drawn out of the storage tank to leave enough capacity to receive the contents of the mixing tank 11.

This cycle as briefly described above is accomplished automatically (with overriding manual controls, where desirable) by the mechanism already described in connection with FIG. 1, plus the necessary electrical circuits for activating the various parts in the proper sequence. The major parts of the electrical circuit will now be described with reference to the wiring diagram, FIG. 2, those parts of the diagram not specifically referred to herein being readily understood by those skilled in the art without need for further explanation.

At this point it may be explained that the previously mentioned controller unit 135, which has also been referred to above as a timed program controller known also as a "Flex-O-Timer," is a well known commercially available mechanism having parts rotated by an electric motor, with settable or adjustable members effective, during rotation, to open or close various electric circuits and pneumatic valves at predetermined time intervals. Since this is a well known commercial controller, the detailed construction of which forms no part of the present invention, it is thought unnecessary to describe it in detail and it is sufficient to indicate the various electric circuits and pneumatic circuits controlled by the controller.

Figure 2:
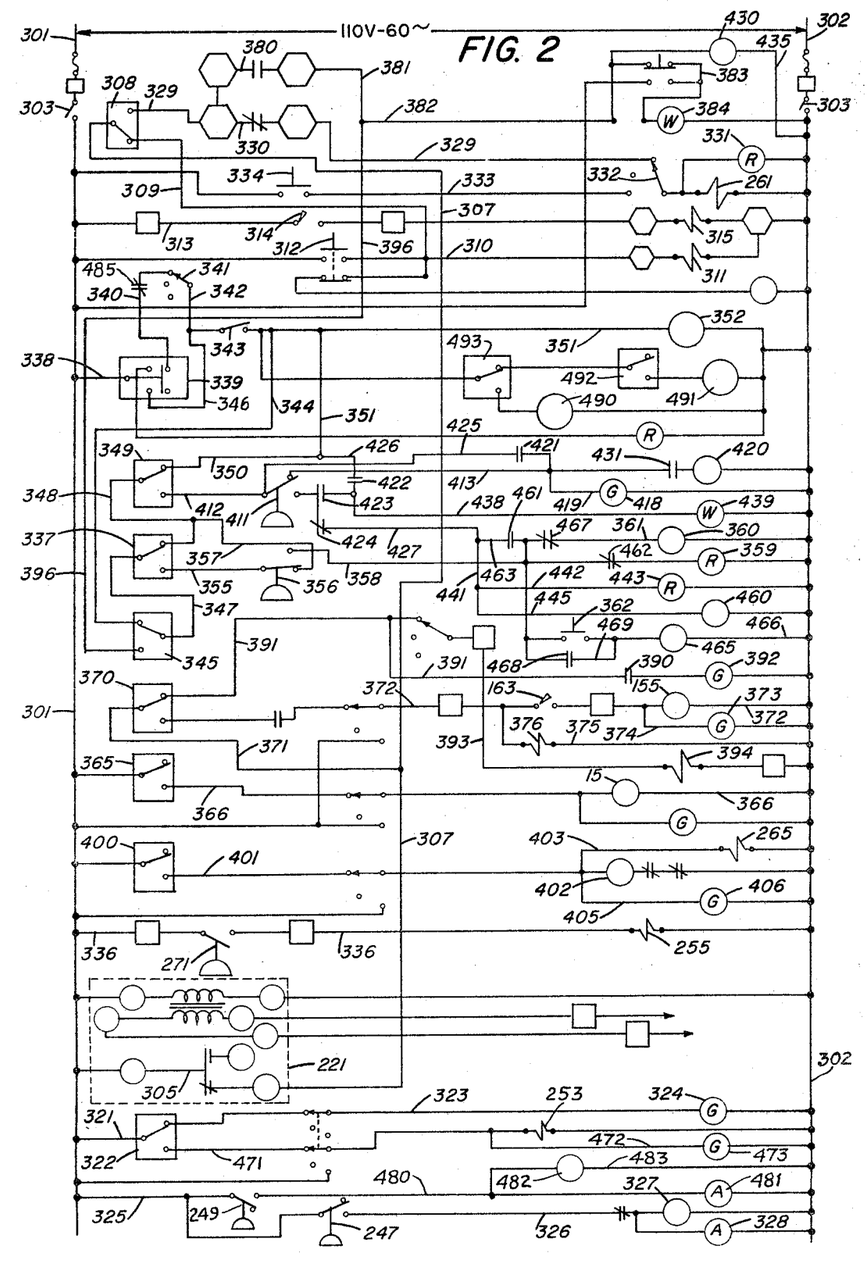
FIG. 2 is a schematic wiring diagram of the apparatus.

Referring now to the wiring diagram in FIG. 2, the main electrical leads are indicated at 301 and 302, providing current at, for example, 110 volts, 60 cycles.

Figure 3:
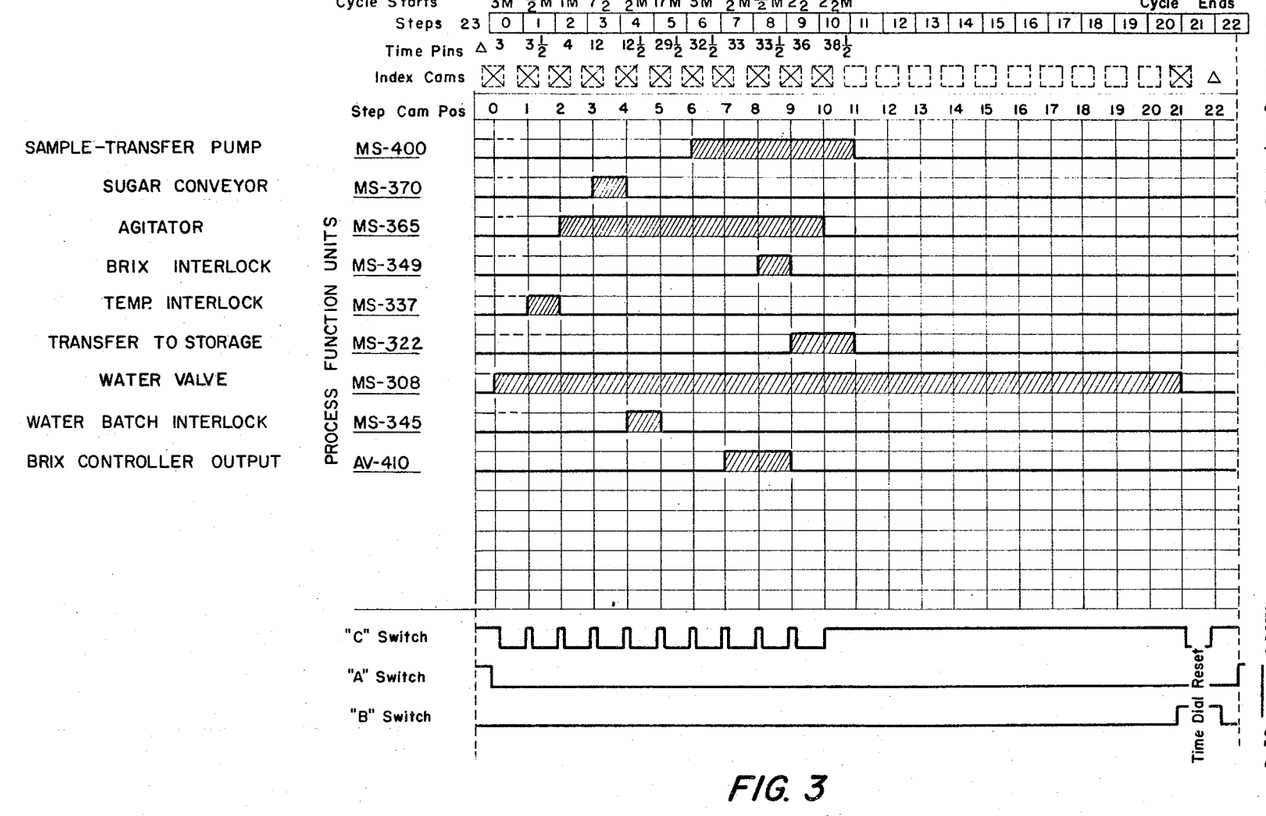
FIG. 3 is a cycle diagram illustrating the operation of the timer which constitutes part of the apparatus.

Assume that the level in the main storage tank 93 is sufficiently low so that another batch of mixture from the tank could be accommodated therein, and assume that the program controller 135 is in the initial starting position known as step 23 (see the cycle diagram, FIG. 3). When the main power switch or starting switch 303 (FIG. 2) is turned on, the following will occur:

Since the level of water in the mixing tank 11 is low, the water level probe 221 (FIGS. 1 and 2) is not energized and hence power is supplied through the circuit conductors 305 and 307 (FIG. 2) to the microswitch 308, the contact of which is in the lower position, furnishing power to the conductor 309 from which it flows to the conductor 310 leading to the clutch winding 311 of the water counter 177 (FIG. 1). This energizes the water counter clutch and at the same time resets the water counter to its starting position. It can also be reset manually, when desired, by pressing the push button switch 312. Also, through the conductor 313 which goes through the make and break contact 314 of the water counter 177 (FIG. 1) and through the actuating coil 315 (FIG. 2) of the counter, any flow of water will be measured or counted.

Since the three way diversion valve 89 (FIG. 1) is in its normal position to send the flow into the conduit 94 to the bubble column rather than into the conduit 91 to the storage tank, there will be a circuit through the conductor 321 (FIG. 2) and the microswitch 322 and conductor 323 to the green pilot light 324 which, being illuminated, indicates that the flow is to the bubble column rather than the storage tank. Also, since the level in the storage tank 93 is low, the pressure switch 247 (FIGS. 1 and 2) which is closed under low pressure conditions and opened under high pressure conditions, will be closed, thereby completing a circuit through the conductor 325 and through the closed switch 247 and conductor 326 to the flasher 327 and flashing amber pilot light 328 which will indicate that the level in the storage tank 93 is sufficiently low so that the tank can receive a fresh batch from the melt tank 11, so that it is all right to mix a fresh batch.

The program controller 135 runs from step 23 to step 0, at which point the controller operates the previously mentioned microswitch 308 (near the top of FIG. 2) to shift the movable contact from the down position, connected to the conductor 309, to the up position, connected to the conductor 329. When speaking of the "up" and "down" positions of this switch and various other switches, these words are used only for convenience of description, referring to the positions as illustrated in FIG. 2. In the actual structure, the switches may be mounted in any desired position of orientation, without reference to the "up" or "down" designations used in describing the wiring diagram. When the switch 308 moves to the up position, it supplies current to the coil of the solenoid valve 261 (see also FIG. 1) to actuate this valve to cause it, through the pneumatic conduit 263, to open the water inlet control valve 175 so that flow of water commences to the water heater 179 and thence through the conduit 189 into the melt tank 11. From the cycle diagram, FIG. 3, which should be considered concurrently with the wiring diagram, FIG. 2, it is seen that the above mentioned microswitch 308, actuated when the timer reaches step 0, remains in this same actuated condition until the timer reaches step 21, at which time the switch 308 returns to its initial position. However, this does not mean that the water control solenoid valve 261 (which in turn controls the actual water valve 175) is activated during this entire time. On the contrary, the circuit 329 to the solenoid valve 261 passes through the water counter mechanism, the electric contacts of which are schematically shown at 330, these contacts being closed so long as the counter has not measured the required quantity of water, and being opened when the required quantity of water has been reached. This cuts off the power to the coil of the solenoid valve 261, so that the water control valve 175 closes, stopping further flow of water into the melt tank 11.

So long as the coil 261 is energized, a red pilot light 331, connected in parallel with the coil, is lit to indicate that water is flowing into the melt tank. If it is desired to control flow of water manually rather than through the automatic mechanism above mentioned, the switch 332 is shifted from the automatic position to the manual position, thus connecting the coil 261 to a power circuit 333 passing through a push button switch 334 which, when closed, will energize the coil 261 to open the valve 175 for admission of water.

When the water pressure in the water line to the right of the valve 175 rises, on account of the opening of this valve, the increasing pressure closes a pressure switch 271 (FIGS. 1 and 2) located in the water supply line. As seen in FIG. 2 (near the bottom) the closing of this switch will supply power through the circuit conductor 336 to the solenoid valve 255, so that this valve will pneumatically actuate the steam supply valve 185 to admit steam from the line 181 to the water heater 179. With this arrangement, steam normally cannot reach the heater 179 until the flow of water has started, although there is a manually valved by-pass 273 around the steam valve 185 for admitting steam if desired. The output of the temperature controller 195 includes a connection 275 to the solenoid valve 255, as seen in FIG. 1, to provide a throttling action on the steam supply, to keep the inflowing water at the proper temperature.

The program controller 135 continues on from step 0 to step 1, the time interval between step 0 and step 1 being preferably about three minutes. Under normal flow conditions, this is sufficient to raise the water level in the melt tank 11 to a level about that of the temperature sensing bulb 197. When the program controller reaches step 1, it shifts the temperature interlock microswitch 337 (FIG. 2) from the upper contact position to the lower contact position. This microswitch is initially connected to power through the line 338 and switch 339 in the right hand position thereof, thence through the conductor 340, through the normally closed relay contacts 485, and through switch 341, conductor 342, switch 343, and conductor 344 to the water interlock microswitch 345 and then through this switch and the conductor 347 to the above mentioned temperature interlock microswitch 337. However, before the program controller gets to step 1 to shift the microswitch 337, it will have moved the A switch 339 from the right hand position to the left hand position, thereby shifting the power supply to go through the conductor 346 directly from the switch 339 to the conductor 344, by-passing 340, 341, and 485.

Previous to the arrival of the program controller at step 1, the microswitch 337 was in its upper position illustrated in FIG. 2, supplying current from the conductor 347 to the conductor 348 leading to the Brix interlock microswitch 349, thence through the upper contact of this switch to the conductor 350 and the conductor 351 supplying power to the timing motor 352 of the program controller 135. Through the circuit just mentioned, the timing motor is kept running prior to the time that the program controller reaches step 1 of its cycle. But when it reaches step 1, the temperature interlock switch 337 is shifted to its down position, as above mentioned. Then, instead of a direct connection from the upper contact of the switch 337 to the conductor 348, the circuit runs through the lower contact of the switch 337, through the conductor 355, pressure sensitive switch 356 (see also FIG. 1) and conductor 357 to the conductor 348. So the timing motor 352 continues to be supplied with a current and continues to run, if the pressure sensitive switch 356 is closed, but the timing motor will stop at this point if the pressure sensitive switch 356 is open.

This pressure switch 356, as seen in FIG. 1, is connected to the output conduit 277 of the recorder controller 195, which output conduit 277 carries a pneumatic pressure responsive to the temperature as sensed by the bulb 197 in the melt tank 11. When the temperature sensed by the bulb 197 (that is, the temperature of the water which has been added to the melt tank 11) is correct, the output of the instrument 195 through the output conduit 277 is low, so that the pressure in the pressure sensitive switch 356 is low and the switch is closed, in the position shown in FIG. 2, thereby completing the circuit to the timing motor 352 as above explained, so the motor continues to run. However, if the temperature sensed by the bulb 197 is not correct, the output of the instrument 195 through the conduit 277 is higher, and this opens the pressure sensitive switch 356 to the circuit 357, closing another circuit to the conductor 358, in which there is a red pilot light 359 which will become illuminated to show that the temperature is wrong. At the same time, a buzzer or horn or other audible signal 360, in the conductor 361 arranged in parallel or shunt around the pilot light 359, will sound in order to call the operator's attention to the incorrect temperature. An acknowledgement button 362, in an acknowledgement circuit further described below, is provided, so that when this button is pressed momentarily, it will stop the sounding of the audible signal 360 but the pilot light 359 remains lit until the erroneous condition has been corrected.

As above mentioned, the timing motor 352 stops when the controller reaches step 2, if the water temperature is too low. When the operator has corrected the situation, as for example by taking steps to secure a sufficient supply of steam for the water heater and introducing additional water through the manual water control means 333, 334, the pressure sensitive valve 356 will resume its normal position supplying current to the conductor 357 and thence to the conductor 348, so that the timing motor 352 will restart and the cycle will continue.

When the controller 135 reaches step 3, the agitator microswitch 365, previously open, will be closed, thereby supplying current through the conductor 366 to the agitator motor 15 (see FIG. 1 as well as FIG. 2) so that the agitator 13 is started. At the same time (that is, upon arrival at step 2) the temperature interlock microswitch 337 is shifted back to its original or upper position, and the timing motor 352 then continues to run through the circuit conductor 348, by-passing the pressure sensitive switch 356.

Upon arrival of the controller at step 3, the sugar conveyor microswitch 370 is actuated to shift from the upper contact position to the lower contact position. This microswitch 370 receives power from a branch 371 leading from the above mentioned conductor 307, and when the switch is shifted to the lower contact position, it supplies power through the conductor 372 to the motor 155 of the sugar conveyor, thus starting the conveyor to deliver sugar into the melt tank 11, when the dump valve 159 reaches open position. A green pilot light 373 in a shunt circuit around the motor 155 becomes illuminated to show that sugar is going in.

When speaking of this motor and certain other motors referred to, it should be understood that the motors themselves are not necessarily directly in the respective circuits shown in FIG. 2, but may be in separate circuits controlled by relays or starters which are directly in the circuits shown in FIG. 2. This is, of course, well understood by those skilled in the electric motor art, but for the sake of simplicity the wiring diagram shows the motors themselves as being directly in the circuits indicated, rather than having their control relays or starters in these circuits.

At the same time that the actuation of the microswitch 370 furnishes power to start the sugar conveyor motor 155, it also supplies power to a parallel conductor 375 containing the solenoid 376 which is in the sugar valve control unit 161 (see FIG. 1) in order to open the sugar dump valve 159. The dump valve mechanism also actuates the limit switch 163 (FIGS. 1 and 2) which limit switch is in the line 372 going to the conveyor motor 155, and does not close until the sugar dump valve 159 is open, so that the conveyor motor cannot start until the dump valve is open.

As already briefly mentioned near the beginning of this specification, the quantity of sugar added to the tank 11 when preparing each batch is measured by the element of time, rather than by weight. Moreover, sufficient sugar is added, in proportion to the quantity of water supplied to the tank 11, to make a sugar solution of greater strength or higher Brix than the final strength desired. The time interval from step 3 to step 4 is chosen to accomplish this. During the movement of the controller from step 3 to step 4, the addition of the desired initial quantity of water will normally be completed; that is, the water counter 177 will normally "count out" and open the circuit at the point 330, de-energizing the coil of the solenoid valve 261, thereby causing the pneumatic water vlave 175 to close.

When the water valve 175 closes as a result of the counter 177 reaching the predetermined count and opening the circuit at 330, this lowers the pressure in the water line 171 so that the pressure sensitive switch 271 opens, thereby de-energizing the solenoid valve 255 to close the steam valve 185 to stop flow of steam to the water heater 179. Also, the water counter contacts 380 close, serving through the conductors 381 and 382 and 383 to light the white pilot light 384 indicating that the desired initial quantity of water has all been placed in the melt tank 11.

At the same time that the pilot light 384 is lit, a relay 430 in a shunt circuit 435 in parallel with the light 384 is energized and closes its normally open contacts 390 in a circuit 391 going to the upper contact of the sugar conveyor microswitch 370. In this same circuit 391 is a green pilot light 392. The closing of the relay contacts 390 will have no effect at this time, because the circuit is still open at the microswitch 370 which is in its lower position rather than its upper position. But when the program controller 135 reaches step 4, the microswitch 370 shifts back to its upper position instead of its lower position, as indicated in the cycle diagram, FIG. 3. This completes the circuit through the conductor 391 and the now closed relay contacts 390, lighting the pilot light 392 to indicate that the addition of sugar to the melt tank 11 has been completed. At the same time, the power supplied to the circuit 391 because of the change in position of the microswitch 370 serves also, through the circuit connection 393, to energize the solenoid 394 which is part of the control mechanism 161 of the sugar dump valve 159, thereby closing the dump valve. Through the action of the limit switch 163 moved by the closing of the dump valve, the circuit 372 going to the conveyor motor 155 is opened at the switch 163, but the circuit is also opened by the shift of the microswitch 370 from the lower position to the upper position (upon the controller reaching step 4) so that in any event the motion of the sugar conveyor is stopped.

Another action which occurs when the controller reaches step 4, is that the water batch interlock microswitch 345 is shifted from its upper position to its lower position. If at this time the full initial quantity of water has been placed in the tank 11, the contact 380 of the water counter will be closed, so that power will be supplied from the water counter switch 380 through the conductors 381 and 396, to the lower contact of the microswitch 345, thereby furnishing power to the conductor 347 and on from it, in the way previously described, to the timing motor 352 of the controller 135, which will thus continue to run. However, if the water is not yet all in, the contact 380 of the water counter will not be closed, so there will be no power in the conductors 381 and 396, and the timing motor 352 will be deprived of power and will stop. The program controller 135 will assume operation when the water counter completes its count and closes the contact 380. With this arrangement, it is insured that the necessary initial water supply is in the tank 11 before the program controller 135 starts the part of its cycle which controls the melting time or solution time.

When the program controller 135 runs on and reaches step 5, there is no change in the position of the microswitch 365, so the agitator continues to run, to promote quick dissolving of the sugar. Upon reaching step 5, the water batch interlock microswitch 345 is shifted back from its lower position to its upper position, as it has already performed its function of testing to make sure that the required water has been added, before permitting the program timer 135 to advance from step 4 to step 5. Step 5 is of relatively long duration, preferably about seventeen minutes, the time being chosen so that the dissolving of the sugar is substantially completed.

When the program timer 135 continues on and reaches the beginning of step 6, the sample transfer pump microswitch 400 is shifted from its upper open position to its lower closed position. In this position, the microswitch serves to connect the main current conductor 301 to the conductor 401 leading to the motor 402 which drives the transfer pump 85. In a parallel or shunt circuit 403 around the motor 402 is the coil of the solenoid valve 265, so that this valve is actuated to supply pneumatic pressure through the conduit 267 to the tank discharge valve 81 which is thereby opened to allow solution from the tank 11 to flow through the conduit 83 to the pump 85. Another shunt circuit 405 in parallel with the motor 402 and circuit 403, contains a green pilot light 406 which, when lit, indicates that the transfer pump 85 is operating.

This step 6 lasts long enough (three minutes, for example) to insure that a sample of the sugar solution as currently existing in the tank 11 completely fills the bubble column or sampling column 19 and overflows at the top thereof to go back into the melt tank 11.

At the conclusion of step 6 (that is, when the timer arrives at the beginning of step 7) an air valve 410 in the program controller 135 is opened. This connects the conduit 131, coming from the Brix recorder controller 125, to the conduit 214 leading to the trim water supply valve 213, which is a pneumatically controlled valve controlled by the pressure in the conduit 214. Hence at this time (the beginning of step 7) the valve 213 comes under the control of the Brix recorder controller 125, because of the connection of the conduit 131 to the conduit 214 through the valve 410. In the conduit 131 is a pressure sensitive switch 411. Step 7 is of minimum duration (30 seconds, for example) simply to allow time for the pressure switch 411 to settle to a position of equilibrium, after the temporary fluctuation of pressure in the line 131 as a result of opening the valve 410.

At the beginning of step 8 of the operation of the program controller 135, the Brix interlock microswitch 349 is shifted from its upper position to its lower position. This supplies current to the conductor 412 leading to the above mentioned pressure sensitive switch 411. At this time, pressure in the line 131, acting on the switch 411, will normally be high, indicating a sugar concentration or Brix reading higher than the final figure desired. Therefore, the pressure switch 411 will be in the position indicated in FIG. 2, supplying current to the conductor 413. This energizes control relay 420 which is in the circuit 413. Also, at this time the timing motor 352 of the program controller 135 stops, because this motor was supplied with current through the conductors 350 and 351, and the shifting of the microswitch 349 from the up position to the down position cuts off the supply of current to the conductor 350.

The energization of the relay 420 has the following effect: It closes the normally open contacts 421 in the conductor 425 which by-passes the switch 411 and thus keeps the relay 420 energized regardless of the position of the switch 411. It also closes the normally open contacts 422 and 423 in a conductor 426 leading from the low contact of the pressure switch 411 to the conductor 351. It also opens the normally closed contacts 424 in the circuit wire 427 leading from the low contact of the switch 411 to the conductor 361. It will be noted that the conductor 413 going to the control relay 420 passes through the normally open contacts 431 of another relay 430, but at this time the contacts 431 have already been closed by energization of the relay 430 which, as shown near the top of FIG. 2, is located in a conductor 435 which goes from conductor 382 to the main 302, so that the relay 430 was previously energized at an earlier stage in the cycle, when power was supplied to the conductor 382. Energization of the relay 430, in addition to closing the normally open contacts 431 in the conductor 413, also closes the normally open relay contacts 390 in the conductor 391 leading to the "sugar in" pilot light 392.

So long as the Brix reading remains higher than the strength ultimately desired, the pressure in the conduit 131, 214 leading to the water trim valve remains high, thereby opening the valve and allowing trim water to enter through the conduit 211. Meanwhile, the motor 85 continues in operation, constantly supplying a fresh sample of the liquid to the bubble column 19, so that as the Brix changes as a result of addition of trim water, the Brix recorder controller 125 constantly senses the changing value of the Brix. When the Brix of the solution reaches the desired point, the pressure in the pneumatic control line 131, 214 drops, and the trim water valve 213 closes. At the same time, the pressure sensitive switch 411 senses the drop in pressure and changes from its upper contact position to it lower contact position. This will cut off the supply of current to the conductor 413 directly from the upper contact of the pressure sensitive switch 411, but current will still be supplied through the by-pass conductor 425, so that the relay 420 will continue to be energized and the green pilot light 418 will continue. The shift of the switch 411 to the lower contact position will supply current through the conductor 426 (since the relay contacts 422 and 423 are closed at this time) to the conductor 351 which leads to the timer motor 352 of the program controller 135, so the timer motor will start again and the time cycle will be resumed. It will be appreciated from what has been said above that step 8 of the cycle is of indefinite duration, since the timing motor is stopped at the beginning of step 8 and does not resume operation until the Brix of the solution has been brought down to the desired final value, by addition of trim water.

Also, the movement of the pressure sensitive switch 411 from its upper contact position to its lower contact position has the further result of energizing the conductor 438 which leads from the conductor 426 through a white pilot light 439 to the main 302, thereby lighting the pilot light 439 to indicate that the sugar solution is at the proper Brix value and is ready to be transferred from the melt tank 11 to the main storage tank 93.

Assume that the Brix is too low at the beginning of step 8, because insufficient dry sugar was added in step 3. If this were the case, pressure switch 411 in the pneumatic control line 131 would be in its low pressure position rather than its high pressure position, at the beginning of step 8, and the control relay 420 would not have been energized. Therefore the normally closed contacts 424 of relay 420 would still be closed, and current could flow through the pressure switch 411 in its low position, thence through the conductor 427 to a branch 441 thereof, thence through another conductor 442 to the red pilot light 443 which would light, indicating that the Brix is low. At the same time, current would flow from the conductor 441 to the conductor 445 having control relay 460 therein, energizing this relay to close its normally open contacts 461 in a conductor 463 which connects the conductor 427 to the conductor 361. Upon the closing of these contacts 461, current would flow to the conductor 361 and sound the buzzer or audible signal 360, calling the operator's attention to the fact that the Brix was too low. The operator may acknowledge this by pressing the acknowledgment button 362 previously mentioned, which will turn off the audible signal 360 but will not affect the pilot lights.

The pressing of the acknowledgment button has the effect of energizing a relay 465 in the circuit conductor 466 which passes through the acknowledgment button 362. The energization of the relay 466 opens the normally closed contacts 467 in the conductor 361 leading to the audible alarm 360, and at the same time closes the normally open contacts 468 in a shunt circuit 469 around the button 362, so that the relay 465 will remain energized and the audible signal 360 will remain silent, even though the button 362 is pressed only momentarily. The operator having been alerted to the fact that the Brix is too low, he can now take such steps as may be necessary to remedy the situation. The momentary pressing of the acknowledgment button similarly silences the audible signal 360 if it had been activated by low water temperature conditions rather than by low Brix.

The closing of the relay 460 opens the normally closed contacts 462 thereof, thus preventing lighting of the pilot light 359 which indicates a low temperature of the water. Otherwise this pilot light would light when the audible signal 360 went into operation, under the low Brix conditions above mentioned.

Assuming now that the Brix has been brought to the proper strength by the addition of trim water, the timing motor 352 resumes running as above explained, and advances the program controller 135 to step 9. Upon reaching this step, the Brix interlock microswitch 349 shifts back to its upper position, supplying current to the conductor 350 so that the timting motor 352 remains in operation. Also, the pneumatic valve 410 is closed, disconnecting the control conduit 214 of the valve 213 from the Brix controller conduit 131. Also, at step 9 the transfer microswitch 322 is shifted by the program controller from its upper position to its lower position, cutting off current from the conductor 323 leading to the "diverted flow" pilot light 324, and supplying current to the conductor 471 leading to the coil of the solenoid valve 253 which controls the three way diverting valve 89. This actuates the diverting valve to direct the flow into the conduit 91 leading to the storage tank 93, rather than to the conduit 94 leading to the bubble column. At the same time, a shunt circuit 472 around the solenoid coil 253 is energized, lighting a green pilot light 473 which indicates that the liquid sugar is being transferred from the melt tank 11 to the main storage tank 93. The agitator 13 continues in operation during the first part of the transfer step.

Step 9 of the operation of the program controller 135 is of such duration, with reference to the capacity of the melt tank 11 and the capacity of the transfer pump 85, that at the conclusion of step 9, about half of the contents of the melt tank 11 will have been transferred, and it will still be about half full. At this time (that is, at the beginning of step 10) the agitator microswitch 365 is shifted from its down position to its up position, thereby turning off supply of current to the conductor 366 and stopping the agitator motor 15. Step 10 continues for a sufficient length of time to insure that all contents of the tank 11 have been transferred to the main storage tank 93.

When step 10 is completed and step 11 is reached, microswitch 400 is actuated from its down position to its up position, shutting off supply of current to the conductor 401, which extinguishes the pilot light 406 which had indicated that the pump was running, and turns off the motor 402 of the pump 85, and de-energizes the coil of the solenoid valve 265, thus causing the discharge valve 81 to close. At the same time, the transfer microswitch 322 is shifted back from its lower position to its upper position, cutting off current to the conductor 471 and thus cutting off current to the coil of the solenoid valve 253, so that the three way valve 89 controlled by the valve 253 returns to its normal position, open to the conduit 94 and closed to the conduit 91.

The effective part of the cycle is now completed, but the program controller 135 continues to operate idly until it reaches step 21, at which time the microswitch 308 is shifted from its upper position to its lower position, supplying current through the conductors 309 and 310 to energize the counter clutch coil 311 of the water counter, thereby resetting the counter to the preselected value. The time dial of the program controller 135 resets in the usual conventional way, and the program controller proceeds to step 23, where it is ready to start a new cycle beginning with step 0.

The operation as above described presupposes that there is sufficient capacity in the storage tank 93 to receive the liquid from the melt tank 11. However, if the storage tank 93 is already so full that it cannot receive the contents of the tank 11, the weight of the hydrostatic head in the tank 93 will have actuated the pressure switch 249 (near top of FIG. 1, and near bottom of FIG. 2) to close this switch to supply current to the conductor 480, which will light the amber pilot light 481 in this circuit, and also energize a control relay 482 in a shunt circuit 483 in parallel around the pilot light 481. The energization of the relay 482 will open the normally closed contacts 485 of this relay, which contacts are located in the conductor 340, seen near the top of FIG. 2. This will open the circuit at this point and prevent further operation of the cycle or the starting of a new cycle, until enough of the solution has been drawn out of the storage tank 93 to leave sufficient space to receive a complete batch from the melt tank 11.

Various manual switches for by-passing the automatic switches are provided, to enable testing of various phases of the operation, and also to enable manual operation when desired in spite of the various interlocks which are built into the automatic control system. These manual by-passing switches will be obvious from the wiring diagram, and it is thought that they need not be especially described.

Also, it has been mentioned above that the program controller 135 is a standard commercial item, the detailed construction of which is not part of the present invention, so the detailed construction need not be described. However, it may be mentioned in passing that in addition to the timing motor 352 of this controller unit, there is also a conventional step motor 490 and reset motor 491, operating in the customary way in which such motors operate in a commercial unit of this kind. There is a switch 492 sometimes called the B switch, and a switch 493 sometimes called the C switch. The switch sometimes called the A switch in a timer of this kind, is the switch shown at 339 in FIG. 2. The operation of these switches to perform necessary functions such as to actuate the motors 490 and 491 at the proper times, is shown near the bottom of the timing diagram, FIG. 3.

It will be seen from FIG. 3 that at the beginning of the cycle, when moving from step 23 to step 0, the A switch 339 is shifted, moving it from the right hand position shown in FIG. 2 to the left hand position, and it stays in the left hand position until step 23 of the cycle is reached, at which time it goes back to the right hand position. Also it is seen that the C switch 493, controlling the step motor 490, is momentarily actuated once (to shift it from the up position illustrated in FIG. 2, to the down position) at each step of the cycle, from step 1 through step 10, and then at the beginning of step 11 it is shifted to the down position and held in this position until step 21 is reached, during which step the resetting of the dial occurs. Also, the B switch 492 which controls the resetting motor 491 stays in its open or upper position throughout the entire cycle until step 21 is reached, when the switch 492 is briefly closed to enable operation of the resetting motor 491 to reset the time dial to zero. All of this is accomplished in the conventional manner well known in the art.

The amount of water fed into the melt tank 11, the amount of dry sugar, and the adjustments of the elements 67, 73, and 125 can be varied, of course, to produce any desired strength or Brix of the sugar solution, within reasonable limits. Merely as a typical example, and not as a limitation on the invention, it has been found convenient to adjust the variables so as to produce a sugar solution of 57.5 degrees Brix, at standard temperature of 20 degrees centigrade or 68 degrees Fahrenheit. This corresponds to an actual reading (uncorrected for temperature) of 65.4 degrees Brix at a temperature of 45 degrees centigrade or 113 degrees Fahrenheit, which is a convenient temperature to use when forming the solution. Assuming that the differential pressure transmitter 67 is calibrated to operate as a high-gain device responsive to input pressure variations of 5.5 inches of water, it is convenient to dimension the bubbler tubes 25 and 27 in the bubble column 19 so that the lower end of the long tube 27 will be exactly 59.78 inches below the lower end of the short tube 25. This will enable the bubble column and the differential pressure transmitter to accommodate variations in Brix from 60 degrees Brix to 75 degrees Brix, actual reading uncorrected for temperature.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. Liquid sugar solution apparatus comprising a tank, means for introducing a measured quantity of water into said tank, a conveyor for conveying to said tank a uniform quantity of dry sugar per unit of time, means for operating said conveyor for a predetermined time sufficient to deliver to said tank a quantity of sugar sufficient, in proportion to the quantity of water in the tank to produce a sugar solution of greater strength than the strength ultimately desired, means for measuring the strength of the solution produced, and means controlled by said measuring means for adding sufficient trim water to reduce the strength of the solution to the strength ultimately desired.

2. Liquid sugar solution apparatus comprising a tank, means for introducing a measured quantity of water into said tank, means for introducing into said tank a predetermined quantity of dry sugar sufficient, in proportion to the quantity of water in the tank, to produce a sugar solution of greater strength than the strength ultimately desired, differential pressure bubble column means for measuring the strength of the solution produced, and means controlled by said measuring means for adding sufficient trim water to reduce the strength of the solution to the strength ultimately desired.

3. Liquid sugar solution apparatus comprising a tank, means for introducing a measured quantity of water into said tank, means for introducing into said tank a predetermined quantity of dry sugar sufficient, in proportion to the quantity of water in the tank, to produce a sugar solution of greater strength than the strength ultimately desired, a bubble column adapted to be filled with sample liquid from said tank, said bubble column including two air inlet bubbler tubes extending downwardly into the sample liquid in said column and having open lower ends at substantially different elevations therein, means for circulating liquid from said tank through said bubble column and back to said tank to provide in said column a sample supply of liquid of the same solution strength as that in said tank, differential pressure sensing means operatively connected to said bubbler tubes for determining the solution strength of the sample liquid in said bubble column, and means controlled by said strength determining means for adding to said tank sufficient trim water to reduce the strength of the solution therein to the strength ultimately desired.

4. A construction as defined in claim 3, wherein said first mentioned tank is a solution mixing tank, and further including a storage tank, means for transferring solution from said mixing tank to said storage tank, repetitive cycle timing means for operating said water introducing means, said dry sugar introducing means, said liquid circulating means, said trim water adding means and said transferring means in predetermined cyclic relation to each other, and means controlled by the amount of liquid in said storage tank for stopping said repetitive cycle timing means at a predetermined point in its cycle when the amount of liquid in said storage tank leaves insufficient capacity to receive the liquid from said mixing tank.

5. Sugar solution manufacturing apparatus comprising a melt tank, a main water inlet conduit having a main water valve therein and also having a water meter therein, cycle timing means, means controlled by said timing means for opening said main water valve to initiate flow of water into said tank, means controlled by said water meter for closing said main water valve when a predetermined measured quantity of water has been introduced into said tank, a sugar bin for holding a supply of dry sugar, a mechanical conveyor for conveying dry sugar from said bin to said tank at a substantially uniform rate per unit of time, means controlled by said cycle timing means for operating said mechanical conveyor for a predetermined interval of time, thereby to measure the quantity of dry sugar introduced into said tank by the factor of time, means controlled at least in part by said cycle timing means for testing the strength of the solution produced by dissolving said measured quantity of sugar in said measured quantity of water, and means controlled in part by said strength testing means and in part by said cycle timing means for transferring the solution from said melt tank to storage.

6. A construction as defined in claim 5, wherein said means for testing the strength of the solution comprises a bubble column assembly including a bubble column having an open upper end from which excess liquid is adapted to overflow, a container for catching liquid overflowing from said bubble column, a de-aerating chamber having an open upper end at an elevation above that of said bubble column, a liquid conduit leading from substantially the lower end of said de-aerating chamber to substantially the lower end of said bubble column, means for introducing solution to be tested into said de-aerating chamber to flow therefrom through said conduit into said bubble column and to rise in said bubble column and overflow at the open top thereof, two pneumatic bubbler tubes extending downwardly into the solution in said bubble column and having open lower ends at substantially different elevations therein, means for supplying air to the upper ends of said tubes to bubble from the lower ends thereof, and differential pressure sensing means for sensing the difference in air pressure within the two tubes.

References Cited

UNITED STATES PATENTS

| | | | |
|---|---|---|---|
| 2,098,591 | 11/1937 | Neuman | 127—22 |
| 2,206,237 | 7/1940 | Roberts | 127—22 |
| 2,394,549 | 2/1946 | Howe | 137—91 X |
| 2,796,365 | 6/1957 | Thurlings | 127—63 X |
| 2,886,051 | 5/1959 | Kroll et al. | 137—91 |
| 2,975,038 | 3/1961 | Lott | 127—22 |
| 3,161,203 | 12/1964 | Hathorn et al. | 137—91 |

FOREIGN PATENTS 933,337  8/1963  Great Britain.

MORRIS O. WOLK, *Primary Examiner.*

D. G. CONLIN, *Assistant Examiner.*

U.S. Cl. X.R

127—63, 64; 137—91; 73—439; 259—8

UNITED STATES PATENT OFFICE
CERTIFICATE OF CORRECTION

Patent No. 3,428,487                                    February 18, 1969

Edward Ronald Allen

It is certified that error appears in the above identified patent and that said Letters Patent are hereby corrected as shown below:

Column 15, line 38, "57.5" should read -- 67.5 --.

Signed and sealed this 25th day of November 1969.

(SEAL)
Attest:

Edward M. Fletcher, Jr.                          WILLIAM E. SCHUYLER, JR.
Attesting Officer                                         Commissioner of Patents